(12) United States Patent
Haile (10) Patent No.: US 12,306,907 B2
(45) Date of Patent: May 20, 2025

(54) SYSTEM AND METHOD FOR AUTOMATIC DATA CONSISTENCY CHECKING USING AUTOMATICALLY DEFINED RULES

(71) Applicant: Data Culpa, Inc., Carlisle, MA (US)

(72) Inventor: J. Mitchell Haile, Carlisle, MA (US)

(73) Assignee: Data Culpa, Inc., Carlisle, MA (US)

( * ) Notice: Subject to any disclaimer, the term of this patent is extended or adjusted under 35 U.S.C. 154(b) by 499 days.

(21) Appl. No.: 17/722,500

(22) Filed: Apr. 18, 2022

(65) Prior Publication Data

US 2022/0343109 A1    Oct. 27, 2022

Related U.S. Application Data

(60) Provisional application No. 63/178,711, filed on Apr. 23, 2021.

(51) Int. Cl.
| | | |
|---|---|---|
| *G06K 9/00* | (2022.01) |
| *G06F 18/214* | (2023.01) |
| *G06F 18/22* | (2023.01) |
| *G06N 7/01* | (2023.01) |
| *G06N 20/00* | (2019.01) |

(52) U.S. Cl.
CPC ............ *G06F 18/22* (2023.01); *G06F 18/214* (2023.01); *G06N 7/01* (2023.01); *G06N 20/00* (2019.01)

(58) Field of Classification Search
CPC ....... G06F 18/22; G06F 18/214; G06N 20/00; G06N 7/01
USPC .......................................................... 382/159
See application file for complete search history.

(56) References Cited

U.S. PATENT DOCUMENTS

| | | | |
|---|---|---|---|
| 10,754,752 B2 | 8/2020 | Rickard et al. |
| 10,936,479 B2 | 3/2021 | Maag et al. |
| 10,996,878 B2 | 5/2021 | Das et al. |
| 11,131,419 B2 | 9/2021 | Du |
| 11,243,704 B2 | 2/2022 | Das et al. |
| 2020/0210389 A1* | 7/2020 | Swami .................. G06F 16/215 |
| 2020/0409905 A1* | 12/2020 | Pillarick, III ....... G06F 11/3696 |
| 2021/0232591 A1* | 7/2021 | Portisch ............ G06F 16/24564 |

OTHER PUBLICATIONS

Polyzotis, Neoklis, et al. "Data validation for machine learning." Proceedings of machine learning and systems 1 (2019): 334-347. (Year: 2019).*

(Continued)

*Primary Examiner* — Jonathan S Lee (57) ABSTRACT

A data pipeline monitoring system configured to monitor operations of a data pipeline. In the data pipeline monitoring system, data processing circuitry receives a training data set, processes the training data set, and responsively generates a data standard that indicates a preferred data format. The data pipeline receives an input data set, processes the input data set, responsively generates the output data set, and transfers the output data set to the data processing circuitry. The data processing circuitry receives an output data set from the data pipeline. The data processing circuitry determines similarities between the output data set and the data standard. The data processing circuitry scores the output data set based on the similarity between the output data set and the data standard and reports the score.

17 Claims, 7 Drawing Sheets

(56) References Cited

OTHER PUBLICATIONS

Paganelli, Matteo. "Big Data Management and Analytics: Open Challenges and Opportunities for Data Integration and Data Mining" (2021). (Year: 2021).*

Lwakatare, Lucy Ellen, et al. "On the experiences of adopting automated data validation in an industrial machine learning project." 2021 IEEE/ACM 43rd International Conference on Software Engineering: Software Engineering in Practice (ICSE-SEIP). IEEE, 2021. (Year: 2021).*

* cited by examiner

SYSTEM AND METHOD FOR AUTOMATIC DATA CONSISTENCY CHECKING USING AUTOMATICALLY DEFINED RULES

RELATED APPLICATIONS

This application is related to, and claims the benefit of priority to, U.S. Provisional Patent Application 63/178,711 filed on Apr. 23, 2021, and entitled "SYSTEM AND METHOD FOR AUTOMATIC DATA CONSISTENCY CHECKING USING AUTOMATICALLY DEFINED RULES".

BACKGROUND

A data pipeline comprises a series of data processing elements that intake data from a data source, process the input data for a desired effect, and transfer the processed data to a data target. Data pipelines are configured to intake data that comprises a known format for their data processing elements to operate accurately. When the input data to a data pipeline is altered, the data processing elements may not recognize the changes which can cause malfunctions in the operation of the data pipeline. Changes to input data often arise when the data sets are large which results in variety of technical issues exist when processing or ingesting data received through a data pipeline. Implicit schema and schema creep like typos or changes to schema often cause issues when ingesting data. Completeness issues can also arise when ingesting data. For example, completeness can be compromised when there is an incorrect count of data rows/documents, there are missing fields or missing values, and/or there are duplicate and near-duplicate data entries. Additionally, accuracy issues may arise when there are incorrect types in fields. For example, a string field that often comprises numbers is altered to now comprise words. Accuracy issues may further arise when there are incorrect category field values and incorrect continuous field values. For example, a continuous field may usually have distribution between 0 and 100, but the distribution is significantly different on updated rows or out of our usual bounds. Data pipelines may have bugs which impact data quality and data pipeline code is difficult to debug.

Data pipeline monitoring systems are employed to counteract the range of technical issues that occur with data pipelines. Traditional data pipeline monitoring systems employ a user defined ruleset that governs what inputs and outputs for a data pipeline should look like. Manually defining a data ruleset is difficult and may require an extended period of time to create. The amount of high-quality data sets which are needed to manually generate data rulesets are often limited which further compounds this problem. As datasets change due to updates in data generation or updates to the data pipeline operations, manually defined data rulesets need to be updated to reflect the changes. Manual updating of data rulesets is also difficult and may take an extended period of time. Unfortunately, traditional data pipeline monitoring systems do not efficiently and effectively generate data rulesets.

OVERVIEW

This Overview is provided to introduce a selection of concepts in a simplified form that are further described below in the Detail Description. This summary is not intended to identify key features or essential features of the claimed subject matter, nor is it intended to be used as an aid in determining the scope of the claimed subject matter.

Various embodiments of the present technology generally relate to solutions for maintaining data integrity. Some embodiments comprise a data pipeline monitoring system configured to monitor the operations of a data pipeline. The system may comprise data processing circuitry. In some examples, the data processing circuitry receives and processes a training data set. The data processing circuitry responsively generates a data standard that indicates at least a preferred data format. The data processing circuitry receives an output data set from a data pipeline. The data pipeline may receive an input data set, process the input data set, responsively generate the output data set, and transfer the output data set to the data processing circuitry. The data processing circuitry determines similarities between the output data set and the data standard. The data processing circuitry scores the outputs data set based on the similarity between the output data set and the data standard. The data processing circuitry reports the score for the output data set.

In some examples, the data processing circuitry may determine a distance between the output data set and the data standard to determine the similarities. The date processing circuitry may then score the output data set based on the distance. The distance may comprise a geometric distance, a statistical distance, an edit distance, a Jaccard distance, a Hamming distance, or some other type of relevant distance metric. In some examples, the data circuitry may determine the score for the output data set is below a similarity threshold. In response, the data processing circuitry may generate an alert that indicates the score is below the threshold and that indicates elements of the output data set that differ from the data threshold. The data processing circuitry may report the alert.

To generate the data standard, the data processing circuitry may identify a data type, data format, data value range, and/or other attributes of the training data set. The data processing circuitry may further determine an average throughput and entropy for the data pipeline. The data processing circuitry may also receive configuration rules that indicate a preferred data format. The data processing circuitry may then generate the data standard based on the data type, data format, and data value range of the training data set, the average throughput and entropy for the data pipeline, and the data configuration rules that indicates the preferred data format.

In some examples, the data processing circuitry may compare different output data sets generated by a data pipeline. For example, the data processing circuitry may compare the score or a first output data set and the score for a subsequent output data set and determine a score delta between the two output data sets. The data processing circuitry may then report the score delta. In some examples, the data processing circuitry determines joint probability distributions for a first output data set and for a subsequent output data set. The data processing circuitry may determine mutual information between the distributions and reports the mutual information.

The data pipeline, data inputs, and data outputs may take a variety of forms. For example, the data pipeline may comprise a machine learning model, the data inputs may comprise machine learning inputs, and the data outputs may comprise machine learning outputs.

In some embodiments, a non-transitory computer-readable medium storing instructions to monitor operations of a data pipeline is disclosed. The instructions, in response to execution by one or more processors, cause the one or more processors to drive a system to perform pipeline monitoring operations. In some embodiments, a method of operating a data processing system to monitor operations of a data pipeline is disclosed.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology relate to solutions for monitoring the operations of data pipeline systems. More specifically, embodiments of the present technology relate to systems and methods for implicitly generating rules based on selected data and applying the rules to data inputs and outputs of a data pipeline. Now referring to the Figures.

Figure 1:
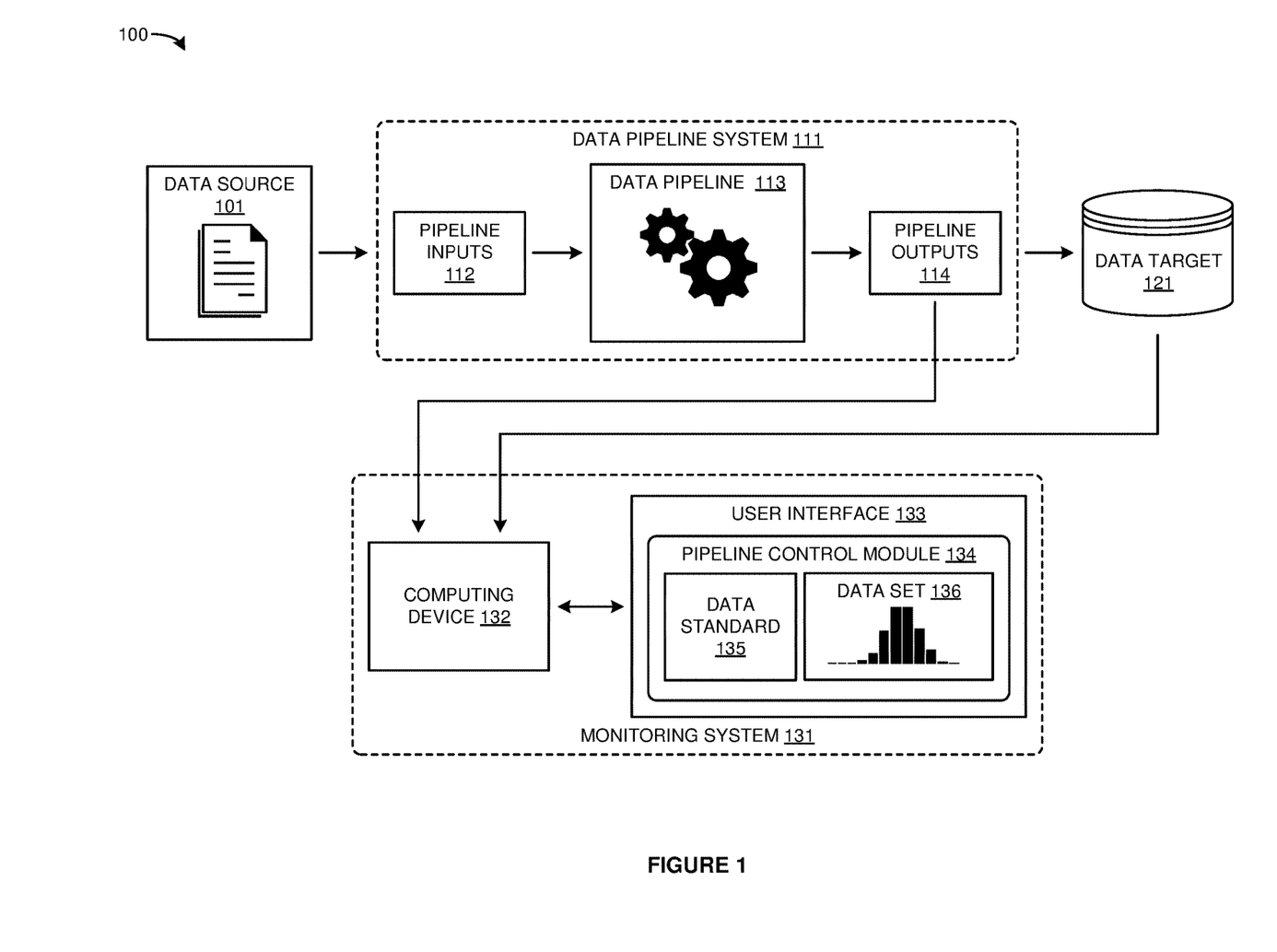
FIG. 1 illustrates an exemplary data processing environment to monitor operations of a data pipeline.

FIG. 1 illustrates data processing environment 100 to monitor operations of a data pipeline. Data processing environment 100 processes raw data generated by data sources into a processed form for use in data analytics, data storage, data harvesting, and the like. Data processing environment 100 comprises data source 101, data pipeline system 111, data target 121, and monitoring system 131. In other examples, data processing environment 100 may include fewer or additional components than those illustrated in FIG. 1. Likewise, the illustrated components of data processing environment 100 may include fewer or additional components, assets, or connections than shown. Each of data source 101, data pipeline system 111, data target 121, and/or monitoring system 131 may be representative of a single computing apparatus or multiple computing apparatuses.

Data source 101 is operatively coupled to data pipeline system 111 and is representative one or more systems, apparatuses, devices, and the like that generate raw data for consumption by data pipeline system 111. Data source 101 may comprise a computing device of an industrial system, a financial system, research system, or some other type of system configured to generate data that characterizes that system. For example, data source 101 may comprise a computer affiliated with an online transaction service that generates sales data which characterizes events performed by the online transaction service. It should be appreciated that the type of data generated by data source 101 is not limited.

Data pipeline system 111 is operatively coupled to data pipeline system 111, data target 121, and monitoring system 131. Data pipeline system 111 is representative of a data processing environment which intakes "raw" or otherwise unprocessed data from data source 101 and emits processed data configured for consumption by an end user. Data pipeline system 111 comprises pipeline inputs 112, data pipeline 113, and pipeline outputs 114. Pipeline inputs 112 comprise unprocessed data generated by data source 101. Pipeline outputs 114 comprise processed data generated by the operation of data pipeline 113. Data pipeline 113 comprises one or more computing devices that are connected in series that intake pipeline inputs 112 received from data source 101 and generate pipeline outputs 114. For example, the computing devices of data pipeline 113 may ingest pipeline inputs 112 and execute transform functions on pipeline inputs 112. The execution of the transform functions alters pipeline inputs 112 into a consumable form to generate pipeline outputs 114. For example, pipeline inputs 112 may comprise a non-standard data format. The execution of the transform functions may standardize the format of pipeline inputs 112 to generate pipeline outputs 114 which can then be loaded into a database on data target 121.

Data target 121 is operatively coupled to data pipeline system 111. Data target 121 is representative of one or more computing systems comprising memory that receive pipeline outputs 114 generated by data pipeline 113. Data target 121 may comprise a database, data structure, data repository, data lake, another data pipeline, and/or some other type of data storage system.

Monitoring system 131 is operatively coupled to data pipeline system 111 and data target 121. Monitoring system 131 is representative of one or more computing systems configured to monitor the operation of data pipeline system 111. Monitoring system 131 comprises computing device 132, user interface 133, pipeline control module 134, data standard 135, and data set 136. Computing device 132 comprises one or more computing apparatuses configured to host an application(s) configured to monitor the operation of data pipeline system 111. It should be appreciated that the specific number of applications/modules hosted by computing device 132 is not limited. Exemplary applications hosted by computing device 102 to monitor the operations of data pipeline system 111 include Data Culpa Validator and the like. Computing device 131 is coupled to user interface 133. User interface 133 comprises a display, keyboard, touchscreen, tablet, and the like. User interface 103 displays a pipeline control module 134 that allows a user to interact with the application(s) hosted by computing device 102, including the application configured to monitor the operation of data pipeline system 111. Pipeline control module 134 comprises data standard 135 and data set 136. Data standard 135 comprises a automatically defined ruleset that indicates preferred data format for pipeline outputs 114 generated by data pipeline 113. Data set 136 comprises a visual representation of an output generated by data pipeline 113. A user may interact with pipeline control module 134 via user interface 133 to generate data standard 135, apply data standard 135 to data set 136, and view data set 136. For example, a user may select data set 136 via user interface 133 to apply data standard 135 to data set 136.

Data source 101, Data pipeline system 111, data target 121, and monitoring system 131 comprise microprocessors, software, memories, transceivers, bus circuitry, and the like. The microprocessors comprise Central Processing Units (CPU), Graphical Processing Units (GPU), Application-Specific Integrated Circuits (ASIC), Field Programmable Gate Array (FPGA), and/or types of processing circuitry. The memories comprise Random Access Memory (RAM), flash circuitry, disk drives, and/or the like. The memories store software like operating systems, user applications, data analysis applications, and data processing functions. The microprocessors retrieve the software from the memories and execute the software to drive the operation of data processing environment 100 as described herein. The communication links that support connect the elements of data processing system use metallic links, glass fibers, radio channels, or some other communication media. The communication links use ENET, Time Division Multiplex (TDM), Data Over Cable System Interface Specification (DOCSIS), Internet Protocol (IP), General Packet Radio Service Transfer Protocol (GTP), Institute of Electrical and Electron Engineers (IEEE) 802.11 (WIFI), IEEE 802.3 (ENET), virtual switching, inter-processor communication, bus interfaces, and/or some other data communication protocols. Data pipeline system 111 and monitoring system 131 may exist as unified computing devices and may be distributed between multiple computing devices.

Figure 2:
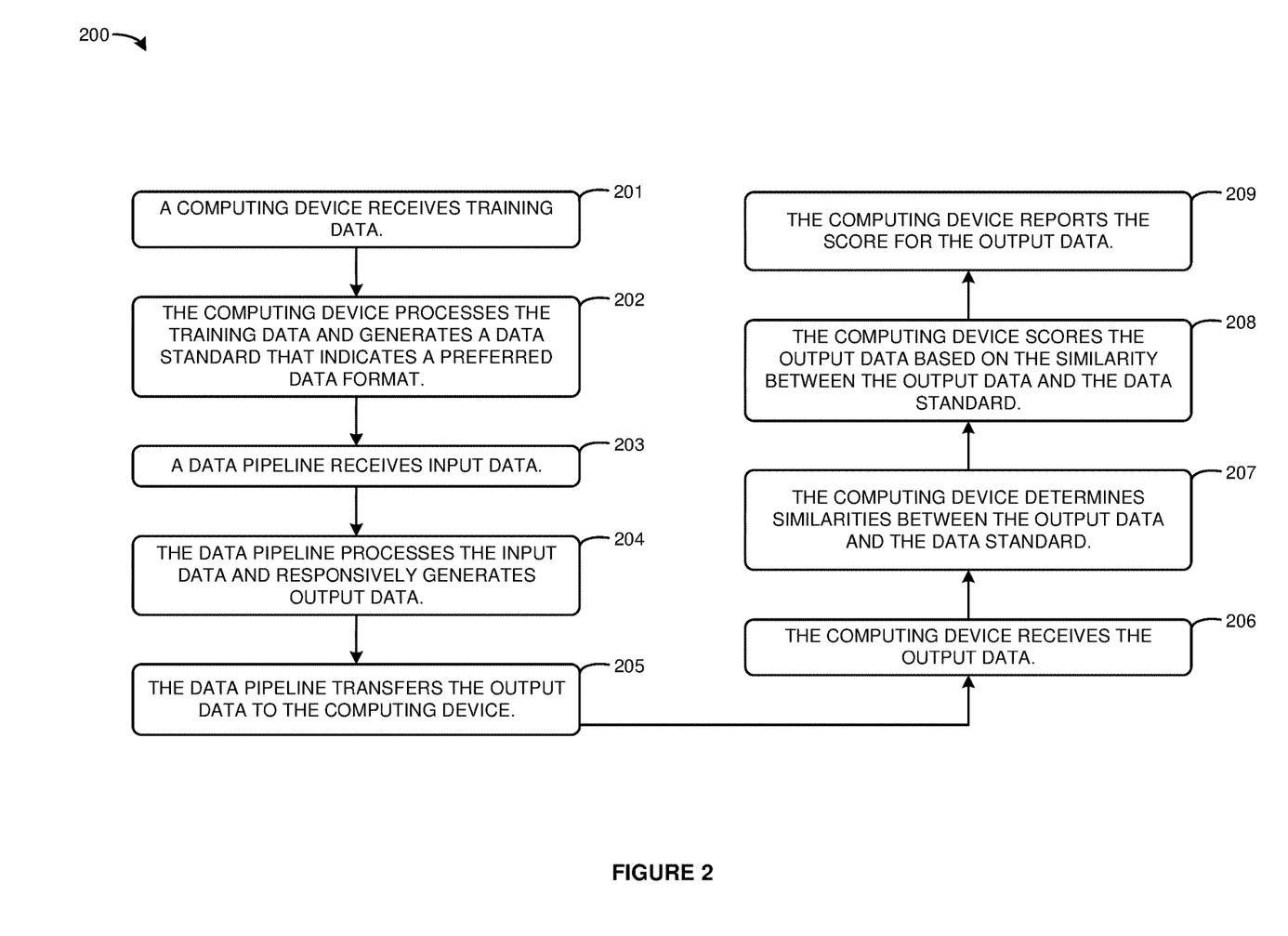
FIG. 2 illustrates an exemplary operation to monitor operations of a data pipeline.

In some examples, data processing environment 100 implements process 200 illustrated in FIG. 2. It should be appreciated that the structure and operation of data processing environment 100 may differ in other examples.

FIG. 2 illustrates process 200. Process 200 comprises a data pipeline monitoring process. Process 200 may be implemented in program instructions in the context of any of the software applications, module components, or other such elements of one or more computing devices. The program instructions direct the computing devices(s) to operate as follows, referred to in the singular for the sake of clarity.

A computing device receives training data (201). The computing device processes the training data and generates a data standard that indicates a preferred data format (202). A data pipeline receives input data (203). The data pipeline processes the input data and responsively generates output data (204). The data pipeline transfers the output data to the computing device (205). The computing device receives the output data (206). The computing device determines similarities between the output data and the data standard (207). The computing device scores the output data based on the similarity between the output data and the data standard (208). The computing device reports the score for the output data (209).

Referring back to FIG. 1, data processing environment 100 includes a brief example of process 200 as employed by one or more applications hosted by computing device 132 and data pipeline 113. The operation may differ in other examples. In operation, data target 121 transfers a training data set to computing devices 132. The training data set may comprise an output generated by data pipeline 113 that comprises a desired format. For example, a human operator may interact with data target 121 via a user interface system and designate a data set stored by data target 121 as a training data set for monitoring system 132. The criteria used to select the training data set is not limited. Typically, the training data set represents accurate and/or normal operations of data pipeline system 111. In some examples, a user will transfer multiple data sets to computing device 132 and subsequently select one of the multiple data sets as training data.

Computing device 132 receives the training data set from data target 121. Computing device 132 processes the training data set to generate data standard 135. Computing device 132 implicitly determines preferred data formats, data ranges, data types, data fields, data volumes, and the like for outputs generated by data pipeline 113. The data standard 135 may comprise a rules template that indicates metadata, data formats, data schemas, data value ranges, data types, data fields, data volumes, or some other type of data attribute that defines a ruleset that indicates a preferred data format for data pipeline 113. In some examples, computing device 132 may receive operator defined rules to incorporate into the implicitly defined data standard 135. For example, the operator defined rules may comprise a similarity threshold for use alongside data standard 135. The similarity threshold may be used to approve or flag pipeline outputs (e.g., pipeline outputs 114) when compared against data standard 135. Computing device 132 stores data standard 135 in memory. In some examples, computing device 132 presents data standard 135 for view on user interface 133.

Data pipeline 113 receives pipeline inputs 112 generated by data source 101. For example, data source 101 may comprise a manufacturing environment which generates production data and transfers the production data to data pipeline system 111 to form pipeline inputs 112. Data pipeline 113 processes the unprocessed data set and responsively generates a pipeline outputs 114. For example, data pipeline 113 may execute a series of data processing steps to transform pipeline inputs 112 into a standardized form configured for storage system 114. Data pipeline system 111 transfers pipeline outputs 114 to computing system 132 in monitoring system 131. For example, data pipeline 113 may call computing device 132 to analyze pipeline outputs 114. Computing system 132 may comprise an Application Programming Interface (API) to facilitate communication with data pipeline 113. Data pipeline 113 also transfers pipeline outputs 114 to data target 121.

Computing system 132 receives pipeline outputs 114 from data pipeline 113. Computing device 132 presents pipeline outputs 114 via pipeline control module 134 on user interface 133 as data set 136. Computing device 132 applies data standard 135 to data set 136. For example, pipeline control module 134 may comprise one or more selectable options that allows a user, vie user interface 133, to apply data standard 135 to data set 136. In other examples, computing device 132 may automatically apply data standard 135 to data set 136 without receiving user input. Computing device 132 determines individual similarities between the data set 136 and data standard 135. For example, computing device 132 may determine similarities between the metadata, data formats, data value ranges, data types, data fields, and/or data volumes of data set 136 and the metadata, data formats, data ranges, data schemas, data types, data fields, and/or data volumes as defined the ruleset of data standard 135. Computing device 132 scores data set 136 based on its similarity with data standard 135. Computing device 132 reports the score for data set 136. For example, computing device 132 may the score via pipeline control module 134 on user interface 133.

In some examples, computing device 132 determines data set 136 is not sufficiently similar to data standard 135. Data standard 135 may comprise a user defined similarity threshold that indicates an acceptable level of difference between data set 136 and data standard 135. For example, the similarity threshold may comprise a percent value (e.g., 85% similarity). Computing device 132 determines when the similarity score for data set 136 is below the similarity threshold. When the similarity score for data set 136 is below the similarity threshold, computing device 132 generates an alert that indicates data set 136. Computing device 136 may present the alert via pipeline control module 134 on user interface 133 for review by a user. The alert may point out which elements of data set 136 fell below the threshold. For example, the alert may indicate data volume of data set 136 is below the similarity threshold.

Advantageously, monitoring system 131 efficiently generates implicitly defined data standard 135 to monitor the operation of data pipeline system 111. Moreover, monitoring system 131 effectively identifies when data set 136 falls below a similarity threshold set by data standard 135 to identify malfunctions in data pipeline system 111.

Figure 3:
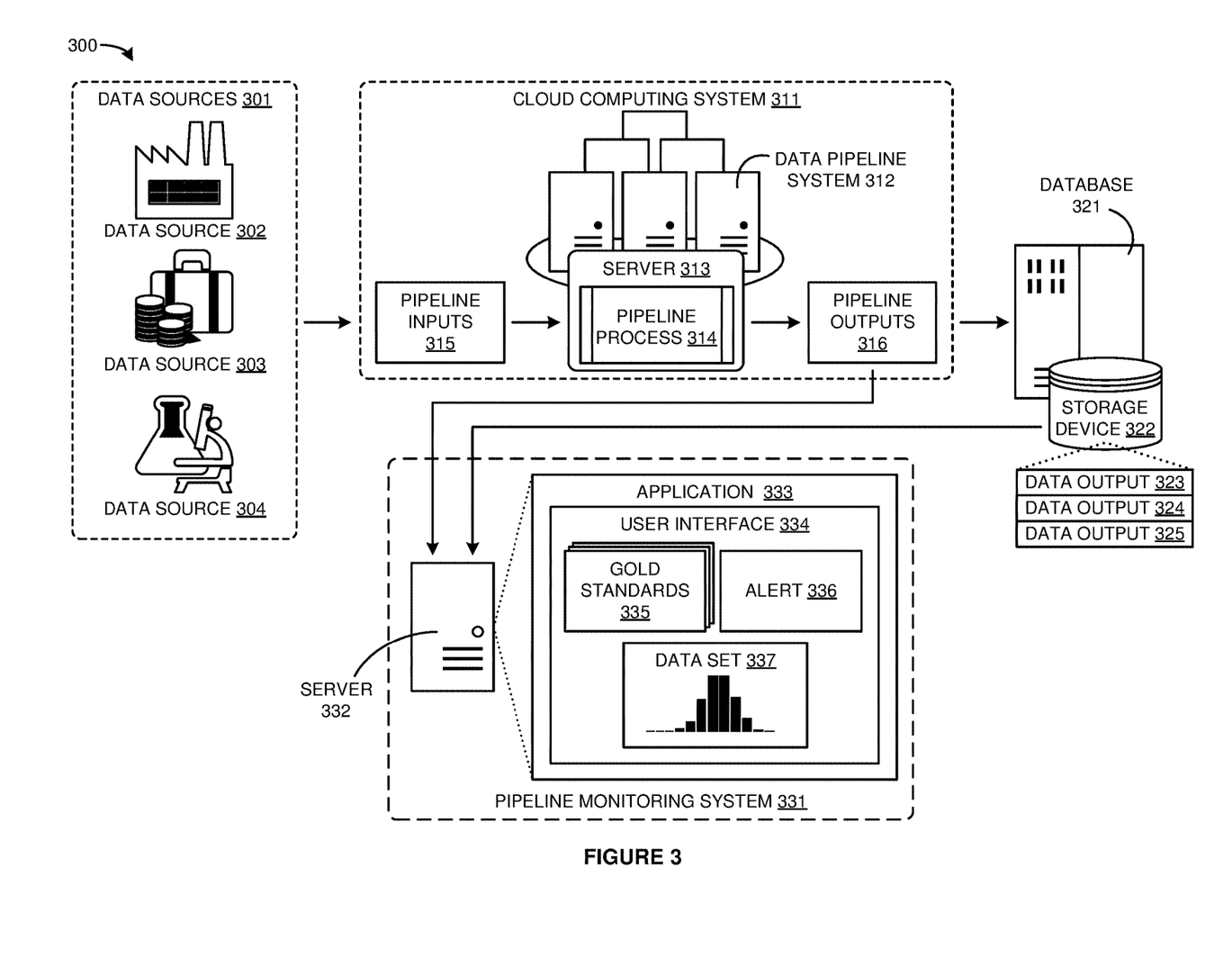
FIG. 3 illustrates an exemplary data processing environment to monitor operations of a data pipeline.

FIG. 3 illustrates data processing environment 300 to monitor operations of a data pipeline. Data processing environment 300 is an example of data processing environment 100, however data processing environment 100 may differ. Data processing environment 300 comprises data sources 301, cloud computing system 311, database 321, and pipeline monitoring system 331. Data sources 301 comprises data sources 302-304. Cloud computing system 311 comprises data pipeline system 312, server 313, pipeline process 314, pipeline inputs 315, and pipeline outputs 316. Database 321 comprises storage device 322 and data outputs 323-324. Pipeline monitoring system 331 comprises server 332, application 333, user interface 334, gold standards 335, alert 336, and data output 337. In other examples, data processing environment 300 may include fewer or additional components than those illustrated in FIG. 3. Likewise, the illustrated components of data processing environment 300 may include fewer or additional components, assets, or connections than shown. Each of data sources 301, cloud computing system 311, storage system 321, and/or pipeline monitoring system 331 may be representative of a single computing apparatus or multiple computing apparatuses.

Data sources 301 is representative of one or more computing devices configured to generate input data configured for ingestion by data pipeline system 312. Data sources 301 comprises individual data sources 302-304. Individual data sources 302-304 may produce industrial data, financial data, scientific data, machine learning data, and/or other types of input data for consumption by data pipeline system 312. Typically, the input data generated by data sources 301 is not-suitable for end user consumption (e.g., storage in database 321) and requires data processing by data pipeline system 312. It should be appreciated that the types of data sources that comprise data sources 301 and the input data generated data sources 301 are not limited.

Cloud computing system 311 is representative of a data processing environment configured to receive and process input data from data sources 301. Cloud computing system 311 is an example of data pipeline system 111, however system 111 may differ. Cloud computing system 311 comprises data pipeline system 312, pipeline inputs 315, and pipeline outputs 316. Data center 312 is representative of one or more computing devices integrated into a network that communicates with data sources 301, database 321, and pipeline monitoring system 331. Examples of data pipeline system 312 may include server computers and data storage devices deployed on-premises, in the cloud, in a hybrid cloud, or elsewhere, by service providers such as enterprises, organizations, individuals, and the like. Data pipeline system 312 may rely on the physical connections provided by one or more other network providers such as transit network providers, Internet backbone providers, and the like to communicate with data sources 301, database 321, and/or pipeline monitoring system 331. Data pipeline system 312 comprises server computer 313 which hosts pipeline process 314.

Server computer 313 comprises processors, bus circuitry, storage devices, software, and the like configured to host pipeline process 314. The processors may comprise Central Processing Units (CPUs), Graphical Processing Units (GPUs), Application Specific Integrated Circuits (ASICs), Field Programmable Gate Arrays (FPGAs), and the like. The storage devices comprise flash circuitry, Random Access Memory (RAM), Hard Disk Drives (HDDs), Solid State Drives (SSDs), Non-Volatile Memory Express (NVMe) SSDs, and the like. The storage devices store the software. The processors may retrieve and execute software stored on the storage devices to drive the operation of pipeline process 314.

Pipeline process 314 is hosted by server computer 313. Pipeline process 314 comprises one or more data processing algorithms configured to transform pipeline inputs 315 into pipeline outputs 316. Pipeline inputs 315 comprise data generated by data sources 301. Pipeline outputs 316 comprise data emitted by pipeline process 314. For example, pipeline process 314 may comprise a data cleaning process that transforms pipeline inputs 315 into pipeline outputs 316 suitable for storage in database 321. The cleaning process may comprise reformatting, redundancy removal, or some other type of operation to standardize pipeline inputs 315. Pipeline process 314 may comprise one or more transform functions configured to operate on pipeline inputs 315. The transform functions may be executed on pipeline inputs 315 and responsively generate pipeline outputs 316. It should be appreciated that pipeline process 314 is exemplary and the specific data processing operations implemented by pipeline process 314 are not limited.

In some examples, pipeline process 314 may comprise a machine learning model where pipeline inputs 315 represent machine learning inputs and pipeline outputs 316 represent machine learning outputs. The machine learning model may comprise one or more machine learning algorithms trained to implement a desired process. Some examples of machine learning algorithms include artificial neural networks, nearest neighbor methods, ensemble random forests, support vector machines, naïve Bayes methods, linear regressions, or other types of machine learning algorithms that predict output data based on input data. In this example, pipeline inputs 315 may comprise feature vectors configured for ingestion by the one or more machine learning algorithms and pipeline outputs 316 may comprise machine learning decisions.

Database 321 comprises storage device 322 and is representative of a data target for pipeline process 314. Database 321 is an example of data target 121, however data target 121 may differ. Database 321 comprises processors, bus circuitry, storage devices (including storage device 322), software, and the like configured to store output data sets 323-325. The processors may comprise CPUs, GPUs, ASICs, and the like. The storage devices comprise flash drives, RAM, HDDs, SSDs, NVMe SSDs, and the like. The processors may retrieve and execute software stored upon the storage devices to drive the operation of database 321. Storage device 322 receives and stores pipeline outputs 316 receives and stores from pipeline process 314. Storage device 322 may implement a data structure that categorizes and organizes pipeline outputs 316 according to a data storage scheme. For example, output data sets 323-325 may be organized by data, size, point of origin, and/or any other suitable data storage scheme. Database 321 may comprise user interface systems like displays, keyboards, touchscreens, and the like that allows a human operator to view the output data sets 323-325 stored upon storage device 322. The user interface systems may allow a human operator to review, select, and transfer ones of data outputs 323-325 to pipeline monitoring system 331.

Pipeline monitoring system 331 is representative of one or more computing devices integrated into a network configured to monitor the operation of data pipeline system 312. Pipeline monitoring system 331 is an example of monitoring system 131, however system 121 may differ. Pipeline monitoring system 331 comprises server computer 332. Server computer 332 comprises one or more computing devices configured to host application 333. The one or more computing devices that comprise server 332 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of application 333.

Application 333 is representative of one or more pipeline monitoring applications user interface applications, operating systems, modules, and the like. Application 333 is configured to receive output data sets from data pipeline system 312 and database 321, generate gold standards 335 based on data sets received from database 321, and apply gold standards 335 to the output data sets received from data pipeline system 312.

User interface 334 is representative of a display that provides a graphical representation of application 333. The graphical representation may include on user interface 334 may include gold standards 335, alert 336, data set 337, and/or other types of visual indicators relevant to the operation and status of data pipeline system 312. Gold standards 335 comprise data standards that comprise automatically defined rules that indicate one or more preferred data formats for output data (e.g., pipeline outputs 316) and/or input data (e.g., pipeline inputs 315) associated with data pipeline system 312. The preferred data formats may comprise metadata, data schemas, data value ranges, data types, and the like. For example, gold standards 335 may indicate the preferred data type as a string. Alert 336 may comprise a notification of when a data output falls below a similarity threshold. Typically, this occurs when an output data set generated pipeline system 312 differs from one or more of gold standards 335. For example, gold standards 335 may indicate a type-A schema while the output data may comprise a type-B schema, and application 333 may responsively generate alert 336 to flag that output data set. Alert 336 may indicate which elements (e.g., fields, data types, volume, schemas, etc.) of the output data set differ from gold standards 335. Data set 337 comprises a visual representation of an output data set or input data set. Data output 337 may comprise a pipeline output or pipeline input (e.g., pipeline outputs 316) received from data pipeline system 312. Data output 337 may comprise an output data set stored by database 321 (e.g., output data sets 323-325).

User interface 334 may include a computer, a display, a mobile device, a touchscreen device, or some other type of computing device capable of performing the user interface functions described herein. A user may interact with application 333 via user interface 334 to generate gold standards 335 and apply gold standards 335 to data sets. For example, a user may import data set 337 from data pipeline system 312 and apply gold standards 335 to data set 337. However, in other examples application 333 may be configured to apply gold standard 335 automatically without the need for human user input. For example, when data pipeline system 312 generates pipeline outputs 316, data pipeline system 312 may transfer pipeline outputs 316 to application 333. Upon reception of pipeline outputs 316, application 333 may automatically apply gold standards 335 to the received data sets.

Figure 4:
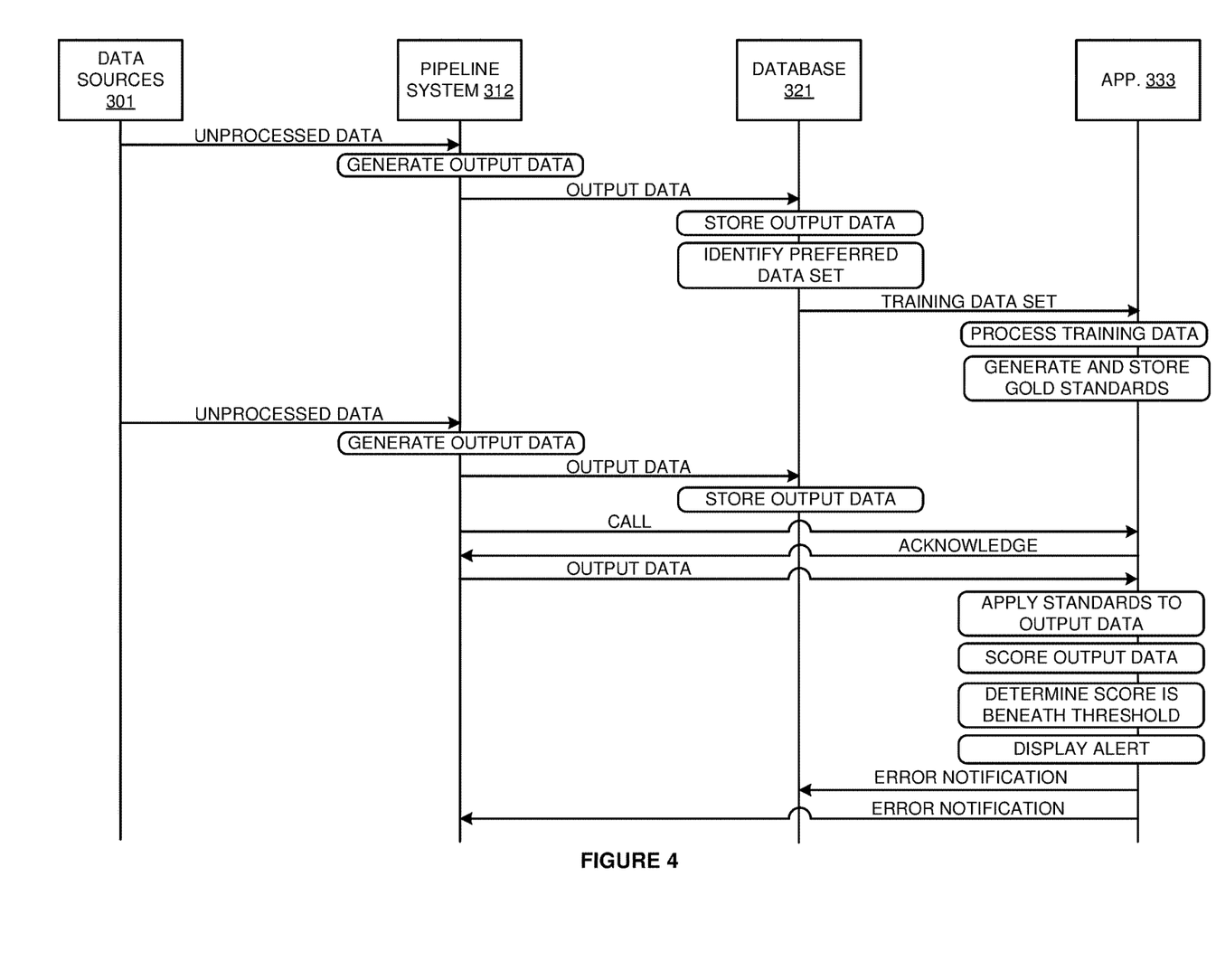
FIG. 4 illustrates an exemplary operation to monitor operations of a data pipeline.

FIG. 4 illustrates an exemplary operation of data processing environment 300 to monitor the operations of data pipeline system 312. The operation depicted by Figured 4 comprises an example of process 200 illustrated in FIG. 2, however process 200 may differ. In other examples, the structure and operation of data processing environment 300 may be different.

In operation, data sources 301 transfer unprocessed data to data pipeline 312. For example, data sources 301 may generate service subscription data and transfer the subscription data to pipeline system 312 from processing. Data pipeline system 312 receives the unprocessed data as pipeline inputs 315. Data pipeline system 312 ingests pipeline inputs 315 and implements pipeline process 314. Pipeline process 314 cleans, transforms, applies a schema, or otherwise processes pipeline inputs 315 into a consumable form to generate pipeline outputs 316. Data pipeline system 312 transfers pipeline outputs 316 to database 321. Database 321 receives pipeline outputs 316 as output data and stores the output data in storage device 322.

Database 321 identifies a preferred data set for use as a training data set for application 333 to generate gold standards 335. For example, a human operator may review output data sets 323-325 stored upon storage device 322 via a user interface component of database 321. The operator may select one of data sets 323-325. The selected one of output data sets 323-325 may be representative of a data set generated by data pipeline system 312 under normal operating conditions. In response to the identification and selection of the training data set, database 321 transfers the training data set to server 332 for delivery to application 333.

Application 333 processes the training data and responsively generates gold standard 335. The data standard comprises rules that define an acceptable data format for processed data generated by pipeline process 314. For example, application 333 may determine a data type, data format, data value range, data field, data throughput, and data entropy for the training data set and responsively generate gold standards 335 that comprises the determined data type, data format, data value range, data field, data throughput, and data entropy. In some examples, application 333 may receive operator defined rules to create the data standard. For example, the operator define rules may indicate acceptable data value ranges, data types, data formats, data throughputs, data entropy and/or other data properties to create the data standard. In some examples, the data standard may comprise the training data set. In some examples, gold standards 355 indicate preferred data formats for data inputs consumed by data pipeline system 312.

Subsequently, data sources 301 transfer additional unprocessed data sets to data pipeline system 312. Data pipeline system 312 receives the unprocessed data as pipeline inputs 315. Data pipeline system 312 ingests pipeline inputs 315 and implements pipeline process 314. Pipeline process 314 processes pipeline inputs 315 into a consumable form to generate pipeline outputs 316. Data pipeline system 312 transfers pipeline outputs 316 to database 321. Database 321 receives pipeline outputs 316 as output data and stores the output data in storage device 322.

Data pipeline system 312 transfers a call to server 332 for delivery to application 333 to apply the gold standards 335 to the outputs data. Application 333 receives the call and transfers an acknowledgment to data pipeline system 312. In response, pipeline system 312 copies the output data to application 333. Application 333 receives the output data and applies gold standards 335 to the output data. Application 333 determines individual similarities between the output data and individual ones of gold standards 335. Application 333 may determine the geometric distance between data values of the output data set and the data standard. When the output data set comprises data strings, application 333 may determine a Jaccard distance, a Hamming distance, an Edit distance, or some other type of geometric distance between the other processed data sets and the data standard.

Application 333 scores the output data set based on its similarity with gold standards 335. The similarity scores indicate how close in format the output data set is to gold standards 335. For example, application 333 may score the output data set high when it is similar to the data standard high and may score the output data set low when it is dissimilar to the data standard. In some examples, the similarity scores fall within a range between zero and one where a high similarity score comprises a value of around "1" while a low similarity score comprises a value of around "0". In some examples, application 333 may determine individual scores for the output data set and individual ones of gold standards 335. Application 333 may average the individual scores to determine a composite score for the output data set. Application 333 determines when the score is beneath a similarity threshold. The similarity threshold may be user defined and indicate an acceptable level of difference between gold standards 335 and the output data. For example, the threshold may indicate that similarity scores above 90% are acceptable. When the score falls below the similarity threshold, application 333 generates an alert that indicates the data set is too dissimilar from the gold standards 335. In some examples, the alert identifies elements within the output data set that caused the dissimilarity and indicates those elements in the alert along with the scores. Application 333 transfers error notifications to database 321 and data pipeline system 312.

In some examples, application 333 may determine the cohesion between individual ones of gold standards 335 to determine how similar they are to each other. When gold standards 335 are cohesive, application 333 may compare two output data sets to gold standards 335 at the same time to determine their similarity. When the gold standards 335 are not cohesive, application 333 may select ones of gold standards 335 to compare a particular output data set. Application 333 may select ones of gold standards 335 based on the type of the output data set. For example, data processing circuitry may select a type-A one of gold standards 335 for a type A output data set and may select a type-B one of gold standards 335 for a type-B output data set.

In some examples, application 333 determines a data degradation threshold and applies the scores to the degradation threshold. The data degradation threshold indicates a minimum quality in the output data generated by data pipeline system 312. Low quality output data may indicate an error has occurred within data pipeline system 312. Application 333 determines when scores fall below the degradation threshold. When the scores for the output data set falls below the degradation threshold, application 333 may generate an alert and reports the alert to notify end users. For example, application 333 may present the alert via user interface 334. The alert indicates which elements the output data set comprised scores below the degradation threshold.

In some examples, application 333 determines changes in data quality over time. Application 333 identifies an initial output data set and a subsequent output data set. For example, the initial set may correspond to a data set from a first week and the subsequent data set may correspond to a following week. Application 333 determines an average score for the initial set and an average score for the subsequent set. Application 333 determines a delta between the average scores of the initial set and the subsequent set. A positive delta indicates an increase in the quality of the other processed data sets over time. A negative delta indicates a decrease in the quality of the other processed data sets over time. A zero delta indicate a no change in the quality of the other processed data sets over time. In some examples, application 333 determines a joint probability distribution for the initial set and a joint probability distribution for the subsequent set to determine changes in data quality. Application 333 identifies changes in the joint probability distributions between the initial and subsequent sets and reports the changes via user interface 334. For example, a significant change in the shape of the joint probability distributions may signify an error in data pipeline system 312. The changes in the joint probability distributions may comprise changes in the standard deviations of the joint probability distributions. Typically, differences between the joint probability distributions are referred to as mutual information.

In some examples, application 333 receives data set from data pipeline system 312 before pipeline circuitry 312 processes the data set (e.g., pipeline inputs 315). Application 333 determines gold standards 335 based on the unprocessed data set. Typically, data pipeline system 312 is configured to intake specific types of unprocessed data and changes in the unprocessed data can cause data pipeline system 312 to erroneously process the data set. Subsequently, application 312 receives the other unprocessed data sets from data pipeline system 111. Application 333 compares the unprocessed data sets to gold standards 335 to determine similarities between the unprocessed sets and the standard. Application 333 scores the unprocessed data sets based on their similarities and reports the scores via user interface 334. Application 333 may track changes in the scores for the unprocessed data sets over time to determine long term changes in the unprocessed data format. As the formats change, application 333 may update gold standards 335 to reflect changes to the input data and output data associated with data pipeline system 312.

Figure 5:
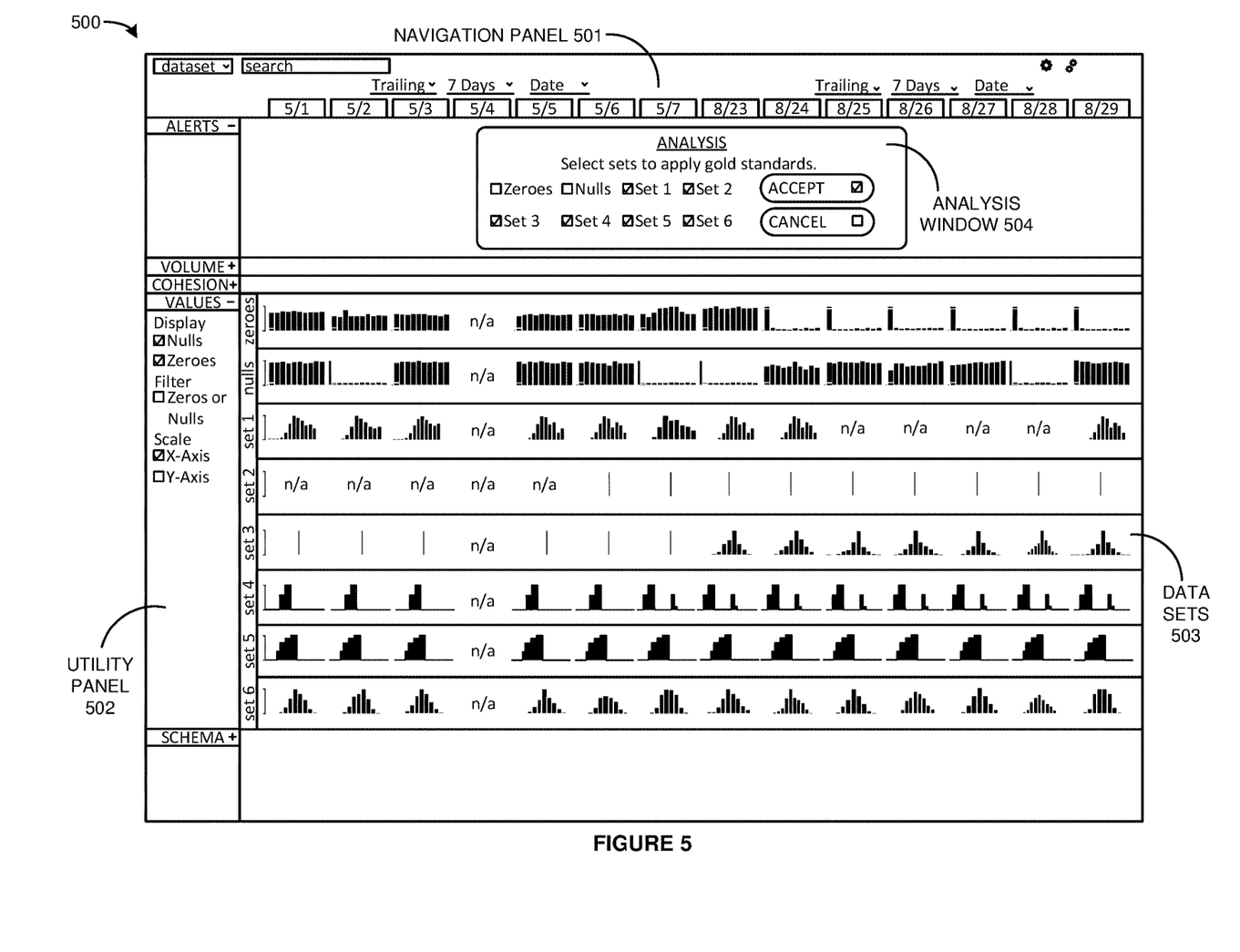
FIG. 5 illustrates an exemplary user interface to facilitate monitoring operations of a data pipeline.

FIG. 5 illustrates user interface 500 to monitor the operation of a data pipeline. User interface 500 comprises an example of user interface 134 and user interface 334, however user interface 134 and user interface 334 may differ. User interface 500 comprises a pipeline monitoring application presented on a display screen which is representative of any user interface for monitoring the operation of a data pipeline. For example, user interface 501 may comprise a Guided User Interface (GUI) configured to allow a user to generate and apply data standards to pipeline data sets, receive alerts regarding a data pipeline, or perform some other type of data pipeline monitoring operation.

User interface 500 includes navigation panel 501. Navigation panel 501 comprises tabs like "dataset" and "search" that allows a user to find and import data sets into user interface 500. For example, a user may interact with the "dataset" tab to import a data set from a data pipeline system. Navigation panel 501 also includes date range options to select data sets a data set from a period of time. In this example, a user has selected to view a data set over two different weeks ranging from May $1^{st}$ to May $7^{th}$ and from August $23^{rd}$ to August $29^{th}$. In other examples, a user may select a different date range and/or a different number of days.

User interface 500 includes utility panel 502. Utility panel 502 comprises tabs labeled "ALERTS", "VOLUME", "COHESION", "VALUES", and "SCHEMA". In other examples, utility panel 502 may comprise different tabs than illustrated in FIG. 5. When a user selects one or the tabs, the tab expands to reveal its contents. In this example, a user has opened the "ALERTS" tab and the "VALUES" tab. The "ALERTS" tab comprises analysis window 504 and the "VALUES" tab comprises data sets 503. The "ALERTS" tab also includes display options to modify the view of data sets 503. The display options include toggles labeled "Nulls", "Zeroes", "Zeroes or Nulls", "X-Axis", and "Y-Axis". In other examples, the display options may differ.

User interface 500 includes data sets 503. Data sets 503 comprises visualizations of data sets imported into user interface 500. In this example, data sets 504 include "zeroes", "nulls", "set 1", "set 2", "set 3", "set 4", "set 5", and "set 6". Each data set of data sets 504 corresponds to the date selected by a user in navigation panel 501. For example, the "zeroes" data set of data sets 503 is presented as a row with each portion of the set corresponding to the dates presented in navigation panel 501. Data sets 503 allows a user to view the shape and/or other attributes of the imported data sets.

User interface 500 includes analysis window 504. Analysis window 504 comprises user selectable options to apply data standards to selected data sets. In this example, a user has selected data sets 1-6 to apply data standards on. Once a user has selected the desired data sets, the user may select the "ACCEPT" button to apply the data standards to the selected data sets. Alternatively, a user may select the "CANCEL" button to close analysis window. When a user selects the "ACCEPT" button, the data pipeline monitoring application applies one or more data standards to data sets 503 to identify similarities between the standard and the data sets. For example, the data standard may define expected schemas, data value ranges, and the like and the data pipeline monitoring application may examine data sets 503 to determine if they comprise the expected data set attributes as defined by the data standard.

Figure 6:
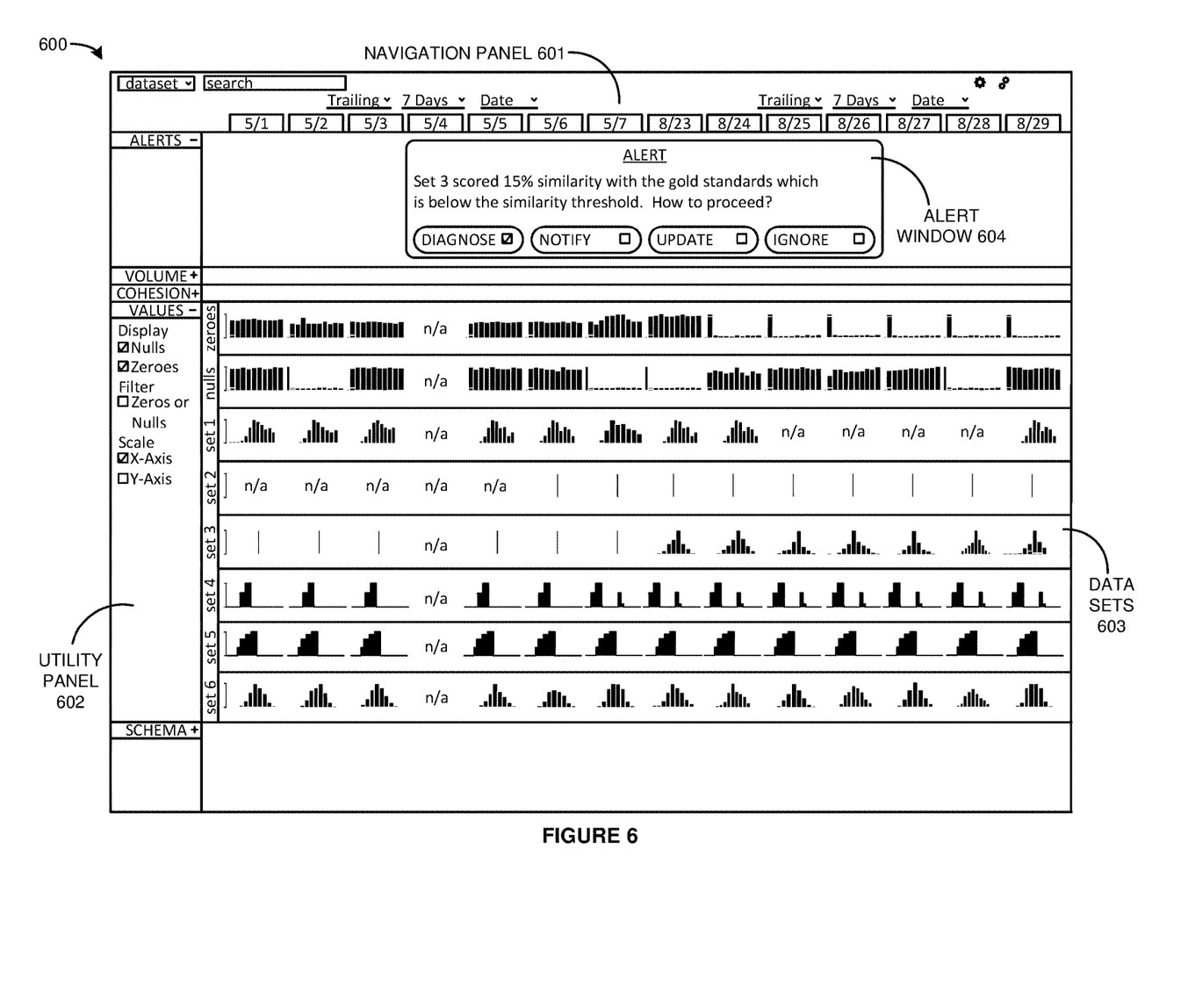
FIG. 6 illustrates an exemplary user interface to facilitate monitoring operations of a data pipeline.

FIG. 6 illustrates user interface 600 to monitor the operation of a data pipeline. User interface 600 comprises an example of user interface 134 and user interface 334, however user interface 134 and user interface 334 may differ. User interface 600 comprises a pipeline monitoring application presented on a display screen which is representative of any user interface for monitoring the operation of a data pipeline. For example, user interface 601 may comprise a GUI configured to allow a user to generate and apply data standards to pipeline data sets, receive alerts regarding a data pipeline, or perform some other type of data pipeline monitoring operation. User interface 600 represents a continuation of operations of user interface 500 presented in FIG. 5.

User interface 600 includes navigation panel 601. Navigation panel 601 comprises tabs like "dataset" and "search" that allows a user to find and import data sets into user interface 600. For example, a user may interact with the "dataset" tab to import a data set from a data pipeline system. Navigation panel 601 also includes date range options to select data sets a data set from a period of time. In this example, a user has selected to view a data set over two different weeks ranging from May $1^{st}$ to May $7^{th}$ and from August $23^{rd}$ to August $29^{th}$. In other examples, a user may select a different date range and/or a different number of days.

User interface 600 includes utility panel 602. Utility panel 602 comprises tabs labeled "ALERTS", "VOLUME", "COHESION", "VALUES", and "SCHEMA". In other examples, utility panel 602 may comprise different tabs than illustrated in FIG. 6. When a user selects one or the tabs, the tab expands to reveal its contents. In this example, a user has opened the "ALERTS" tab and the "VALUES" tab. The "ALERTS" tab comprises alert window 604 and the "VALUES" tab comprises data sets 603. The "ALERTS" tab also includes display options to modify the view of data sets 603. The display options include toggles labeled "Nulls", "Zeroes", "Zeroes or Nulls", "X-Axis", and "Y-Axis". In other examples, the display options may differ.

User interface 600 includes data sets 603. Data sets 603 comprises visualizations of data sets imported into user interface 600. In this example, data sets 604 include "zeroes", "nulls", "set 1", "set 2", "set 3", "set 4", "set 5", and "set 6". Each data set of data sets 604 corresponds to the date selected by a user in navigation panel 601. For example, the "zeroes" data set of data sets 603 is presented as a row with each portion of the set corresponding to the dates presented in navigation panel 601. Data sets 603 allows a user to view the shape and/or other attributes of the imported data sets.

User interface 600 includes alert window 604. Alert window 604 may be generated and presented in response to the application of data standards to data sets 603. For example, after a user selected the "ACCEPT" button of analysis window 504 illustrated in FIG. 5, the data pipeline monitoring application may apply the data standards to the data sets and responsively generate alert window 604. Alert window 604 comprises an alert that indicates that one or more of data sets 603 was not sufficiently similar to the data standards. In the example, alert window 604 indicates that set 3 of data sets 603 scored below a similarity threshold. Alert window 604 comprises options labeled "DIAGNOSE", "NOTIFY", "UPDATE", and "IGNORE". Selecting the "DIAGNOSE" option may cause the application to identify a problem in the data set. Selecting the "NOTIFY" option may cause the application to generate and transfer a notification indication the alert. Selecting the "UPDATE" option may cause the application to update the data standards. Selecting the "IGNORE" option may cause the application to close alert window 604. In other examples, alert window may comprise different options. In this example, a user has selected the "DIAGNOSE" option to identify the reason that set 3 of data sets 603 failed the similarity threshold.

Figure 7:
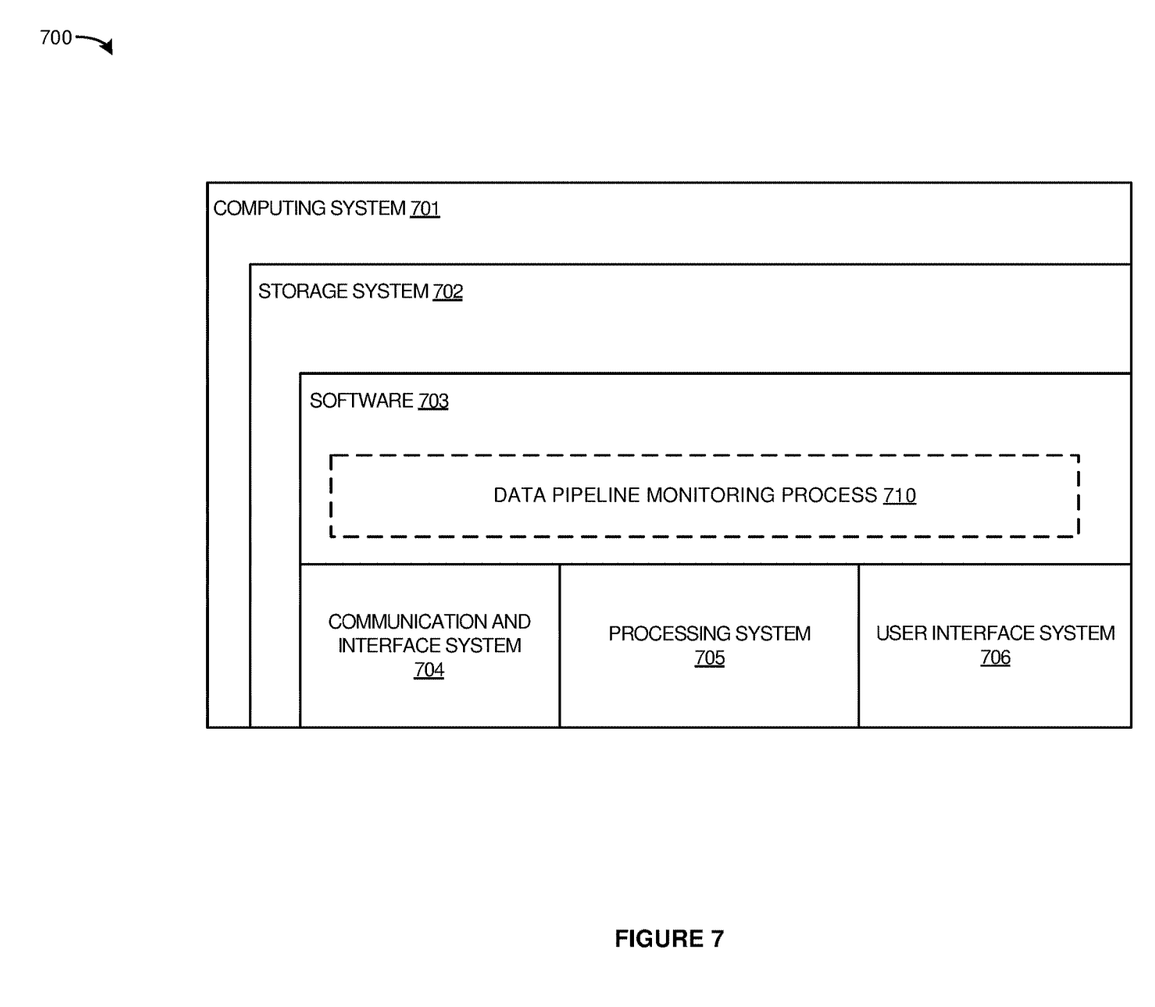
FIG. 7 illustrates an exemplary computing device that may be used in accordance with some embodiments of the present technology.

FIG. 7 illustrates environment 700 which comprises computing device 701. Computing device 701 is representative of any system or collection of systems in which the various processes, programs, services, and scenarios disclosed herein for monitoring the operations of data pipelines within data processing environments may be implemented. For example, computing device 701 may be representative of data pipeline system 111, data target 121, computing device 132, user interface 133, cloud computing system 311, database 321, server 332, user interface 500, and/or user interface 600. Examples of computing system 100 include, but are not limited to, server computers, routers, web servers, cloud computing platforms, and data center equipment, as well as any other type of physical or virtual server machine, physical or virtual router, container, and any variation or combination thereof.

Computing system 701 may be implemented as a single apparatus, system, or device or may be implemented in a distributed manner as multiple apparatuses, systems, or devices. Computing system 701 includes, but is not limited to, storage system 702, software 703, communication and interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements data pipeline monitoring process 710, which is representative of the data monitoring processes discussed with respect to the preceding Figures. For example, process 710 may be representative of process 200 illustrated in FIG. 2 and/or the exemplary operation of environment 300 illustrated in FIG. 4. When executed by processing system 705, software 703 directs processing system 705 to operate as described herein for at least the various processes, operational scenarios, and sequences discussed in the foregoing implementations. Computing system 701 may optionally include additional devices, features, or functionality not discussed here for purposes of brevity.

Processing system 705 may comprise a micro-processor and other circuitry that retrieves and executes software 703 from storage system 702. Processing system 705 may be implemented within a single processing device but may also be distributed across multiple processing devices or sub-systems that cooperate in executing program instructions. Examples of processing system 705 include general purpose central processing units, graphical processing units, application specific processors, and logic devices, as well as any other type of processing device, combinations, or variations thereof.

Storage system 702 may comprise any computer readable storage media that is readable by processing system 705 and capable of storing software 703. Storage system 702 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (data pipeline monitoring process 710) may be implemented in program instructions and among other functions may, when executed by processing system 705, direct processing system 705 to operate as described with respect to the various operational scenarios, sequences, and processes illustrated herein. For example, software 703 may include program instructions for implementing a data monitoring process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to optimize secure traffic as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of a data pipeline monitoring computing device, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A data pipeline monitoring system configured to monitor operations of a data pipeline, the data pipeline monitoring system comprising:
   data processing circuitry configured to receive a training data set and process the training data set;
   the data processing circuitry configured to identify a data type, data format, and data value range of the training data set based on the processing;
   the data processing circuitry configured to determine an average throughput and entropy for the data pipeline;
   the data processing circuitry configured to receive data configuration rules that indicate a preferred data format;
   the data processing circuitry configured to generate a data standard that indicates at least the preferred data format based on the data type, data format, and data value range of the training data set, the average throughput and entropy for the data pipeline, and the data configuration rules that indicates the preferred data format;
   the data processing circuitry configured to receive an output data set from the data pipeline wherein the data pipeline receives an input data set, processes the input data set, responsively generates the output data set, and transfers the output data set to the data processing circuitry; and
   the data processing circuitry configured to determine similarities between the output data set and the data standard, score the output data set based on the similarity between the output data set and the data standard, and report the score for the output data set.

2. The data pipeline monitoring system of claim 1 wherein:
   the data processing circuitry is configured to determine the similarities and score the output data set comprises the data processing circuitry configured to determine a distance between the output data set and the data standard and score the output data set based on the distance; and wherein:
   the distance comprises at least one of a geometric distance, a statistical distance, an edit distance, a Jaccard distance, or a Hamming distance.

3. The data pipeline monitoring system of claim 1 further comprising the data processing circuitry configured to determine the score for the output data set is beneath a similarity threshold, generate an alert that indicates the score for the output data set is below the similarity threshold and that indicates elements of the output data set that differ from the data standard, and report the alert.

4. The data pipeline monitoring system of claim 1 further comprising:
   the data processing circuitry configured to receive an additional output data set wherein the data pipeline receives an additional input data set, processes the additional input data set, responsively generates the additional output data set, and transfers the additional output data set to the data processing circuitry;
   the data processing circuitry configured to determine similarities between the additional output data set and the data standard, and score the additional output data set based on the similarity between the additional output data set and the data standard; and
   the data processing circuitry configured to determine a delta between the score for the output data set and the score for the additional output data set and report the delta.

5. The data pipeline monitoring system of claim 1 further comprising:
   the data processing circuitry configured to receive an additional output data set wherein the data pipeline receives an additional input data set, processes the additional input data set, responsively generates the additional output data set, and transfers the additional output data set to the data processing circuitry; and
   the data processing circuitry configured to determine a joint probability distribution for the output data set, determine another joint probability distribution for the additional output data set, determine mutual information between the joint probability distribution and the other joint probability distribution, and report the mutual information.

6. The data pipeline monitoring system of claim 1 wherein:
   the input data set comprises a machine learning model input;
   the output data set comprises a machine learning model output; and
   the data pipeline comprises a machine learning model.

7. A non-transitory computer-readable medium storing instructions to monitor operations of a data pipeline, wherein the instructions, in response to execution by one or more processors, cause the one or more processors to drive a system to perform operations comprising:
   receiving a training data set and processing the training data set;
   identifying a data type, data format, and data value range of the training data set based on the processing;
   determining an average throughput and entropy for the data pipeline;
   receiving data configuration rules that indicate a preferred data format;
   generating a data standard that indicates at least the preferred data format based on the data type, data format, and data value range of the training data set, the average throughput and entropy for the data pipeline, and the data configuration rules that indicates the preferred data format;
   receiving an output data set from the data pipeline wherein the data pipeline receives an input data set, processes the input data set, responsively generates the output data set, and transfers the output data set; and
   determining similarities between the output data set and the data standard, scoring the output data set based on the similarity between the output data set and the data standard, and reporting the score for the output data set.

8. The non-transitory computer-readable medium of claim 7 wherein:
   determining the similarities and scoring the output data set comprises determining a distance between the output data set and the data standard and score the output data set based on the distance; and wherein:
   the distance comprises at least one of a geometric distance, a statistical distance, an edit distance, a Jaccard distance, or a Hamming distance.

9. The non-transitory computer-readable medium of claim 7, the operations further comprising:
  determining the score for the output data set is beneath a similarity threshold, generating an alert that indicates the score for the output data set is below the similarity threshold and that indicates elements of the output data set that differ from the data standard, and reporting the alert.

10. The non-transitory computer-readable medium of claim 7, the operations further comprising:
  the data processing circuitry receiving an additional output data set, determining similarities between the additional output data set and the data standard, and scoring the additional output data set based on the similarity between the additional output data set and the data standard; and
  determining a delta between the score for the output data set and the score for the additional output data set and reporting the delta.

11. The non-transitory computer-readable medium of claim 7, the operations further comprising:
  determining a joint probability distribution for the output data set, determining another joint probability distribution for an additional output data set, determining mutual information between the joint probability distribution and the other joint probability distribution, and reporting the mutual information.

12. A method of operating a data processing system to monitor operations of a data pipeline, the method comprising:
  data processing circuitry receiving a training data set and processing the training data set;
  the data processing circuitry identifying a data type, data format, and data value range of the training data set based on the processing;
  the data processing circuitry determining an average throughput and entropy for the data pipeline;
  the data processing circuitry receiving data configuration rules that indicate a preferred data format;
  the data processing circuitry generating a data standard that indicates at least the preferred data format based on the data type, data format, and data value range of the training data set, the average throughput and entropy for the data pipeline, and the data configuration rules that indicates the preferred data format;
  the data processing circuitry receiving an output data set from the data pipeline wherein the data pipeline receives an input data set, processes the input data set, responsively generates an output data set, and transfers the output data set to the data processing circuitry; and
  the data processing circuitry determining similarities between the output data set and the data standard, scoring the output data set based on the similarity between the output data set and the data standard, and reporting the score for the output data set.

13. The method of claim 12 wherein:
  the data processing circuitry determining the similarities and scoring the output data set comprises the data processing circuitry determining a distance between the output data set and the data standard and score the output data set based on the distance; and wherein:
  the distance comprises at least one of a geometric distance, a statistical distance, an edit distance, a Jaccard distance, or a Hamming distance.

14. The method of claim 12 further comprising the data processing circuitry determining the score for the output data set is beneath a similarity threshold, generating an alert that indicates the score for the output data set is below the similarity threshold and that indicates elements of the output data set that differ from the data standard, and reporting the alert.

15. The method of claim 12 further comprising:
  the data processing circuitry receiving an additional output data set from the data pipeline wherein the data pipeline receives an additional input data set, processes the additional input data set, responsively generates an additional output data set, and transfers the additional output data set to the data processing circuitry;
  the data processing circuitry determining similarities between the additional output data set and the data standard, and scoring the additional output data set based on the similarity between the additional output data set and the data standard; and
  the data processing circuitry determining a delta between the score for the output data set and the score for the additional output data set and reporting the delta.

16. The method of claim 12 further comprising:
  the data processing circuitry receiving an additional output data set from the data pipeline wherein the data pipeline receives an additional input data set, processes the additional input data set, responsively generates an additional output data set, and transfers the additional output data set to the data processing circuitry; and
  the data processing circuitry determining a joint probability distribution for the output data set, determining another joint probability distribution for the additional output data set, determining mutual information between the joint probability distribution and the other joint probability distribution, and reporting the mutual information.

17. The method of claim 12 wherein:
  the input data set comprises a machine learning model input;
  the output data set comprises a machine learning model output; and
  the data pipeline comprises a machine learning model.

* * * * *